(12) United States Patent
Brewer

(10) Patent No.: US 12,504,923 B2
(45) Date of Patent: Dec. 23, 2025

(54) IDENTIFYING MEMORY HOTSPOTS

(71) Applicant: Micron Technology, Inc., Boise, ID (US)

(72) Inventor: Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 200 days.

(21) Appl. No.: 17/074,755

(22) Filed: Oct. 20, 2020

(65) Prior Publication Data

US 2022/0121394 A1    Apr. 21, 2022

(51) Int. Cl.
 *G06F 3/06* (2006.01)
 *G06F 12/02* (2006.01)

(52) U.S. Cl.
 CPC .......... *G06F 3/0659* (2013.01); *G06F 3/0619* (2013.01); *G06F 3/0653* (2013.01); *G06F 3/0679* (2013.01); *G06F 12/0253* (2013.01); *G06F 2212/7205* (2013.01)

(58) Field of Classification Search
 None
 See application file for complete search history.

(56) References Cited

U.S. PATENT DOCUMENTS

| | | | | |
|---|---|---|---|---|
| 8,782,324 | B1 * | 7/2014 | Chen ..................... | G06F 3/0649 711/102 |
| 11,175,709 | B2 * | 11/2021 | Jain ....................... | G06F 1/3206 |
| 2009/0198940 | A1 * | 8/2009 | Ash ........................ | G06F 3/067 711/165 |
| 2009/0254902 | A1 * | 10/2009 | Chen ...................... | G06F 3/061 718/100 |
| 2011/0131375 | A1 * | 6/2011 | Noeldner ................ | G06F 3/00 711/114 |
| 2012/0110291 | A1 * | 5/2012 | Zilber .................... | G06F 3/0676 711/163 |
| 2015/0370627 | A1 * | 12/2015 | Nakajima ............. | G06F 11/3409 714/2 |
| 2017/0235602 | A1 * | 8/2017 | Li .......................... | G06F 3/0674 719/320 |

FOREIGN PATENT DOCUMENTS

WO    WO-2022115165 A2    6/2022

OTHER PUBLICATIONS

"International Application Serial No. PCT/US2021/053778, International Search Report mailed Jul. 26, 2022", 5 pgs.
"International Application Serial No. PCT/US2021/053778, Written Opinion mailed Jul. 26, 2022", 4 pgs.

\* cited by examiner

*Primary Examiner* — Jared I Rutz
*Assistant Examiner* — Alexander J Yoon
(74) *Attorney, Agent, or Firm* — Schwegman Lundberg & Woessner, P.A.

(57) ABSTRACT

Disclosed in some examples, are methods, systems, machine readable mediums, memory devices, and memory controllers that detect memory hotspots. The system keeps a count of a number of memory accesses that were queued waiting for another memory access to that address to finish. The number of memory accesses may be compared to a hotspot criteria to determine one or more memory hotspots. These hotspots may be sent to a processor, which may store the memory hotspots in a file which may be provided to an administrator.

20 Claims, 6 Drawing Sheets

IDENTIFYING MEMORY HOTSPOTS

STATEMENT REGARDING GOVERNMENT SUPPORT

This invention was made with U.S. Government support under Agreement No. HR00111890003, awarded by DARPA. The U.S. Government has certain rights in the invention.

BACKGROUND

Chiplets are an emerging technique for integrating various processing functionalities. Generally, a chiplet system is made up of discreet modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

FIG. 1, described below, offers an example of a chiplet system and the components operating therein. As explained below, such chiplet systems may include a memory controller that may control one or more memory die. Repeated accesses of a same memory location on the die may cause memory system degradation. These memory "hot spots," in which memory accesses are non-uniform across the memory banks, adversely affect the performance and reliability of the memory system. In some examples, this may be due to unoptimized code that spends a long time waiting for memory accesses due to collisions between these repeated accesses. In addition, depending on the memory storage technology, physical effects from repeatedly accessing a same memory location in a short period of time may degrade the memory cells. Ideally, a program that uses the memory would be written so that memory accesses are even across the die to avoid stressing particular locations of the memory and to ensure optimum program performance. This is not always possible as a programmer does not always know which memory locations may be stressed.

Figure 1A:
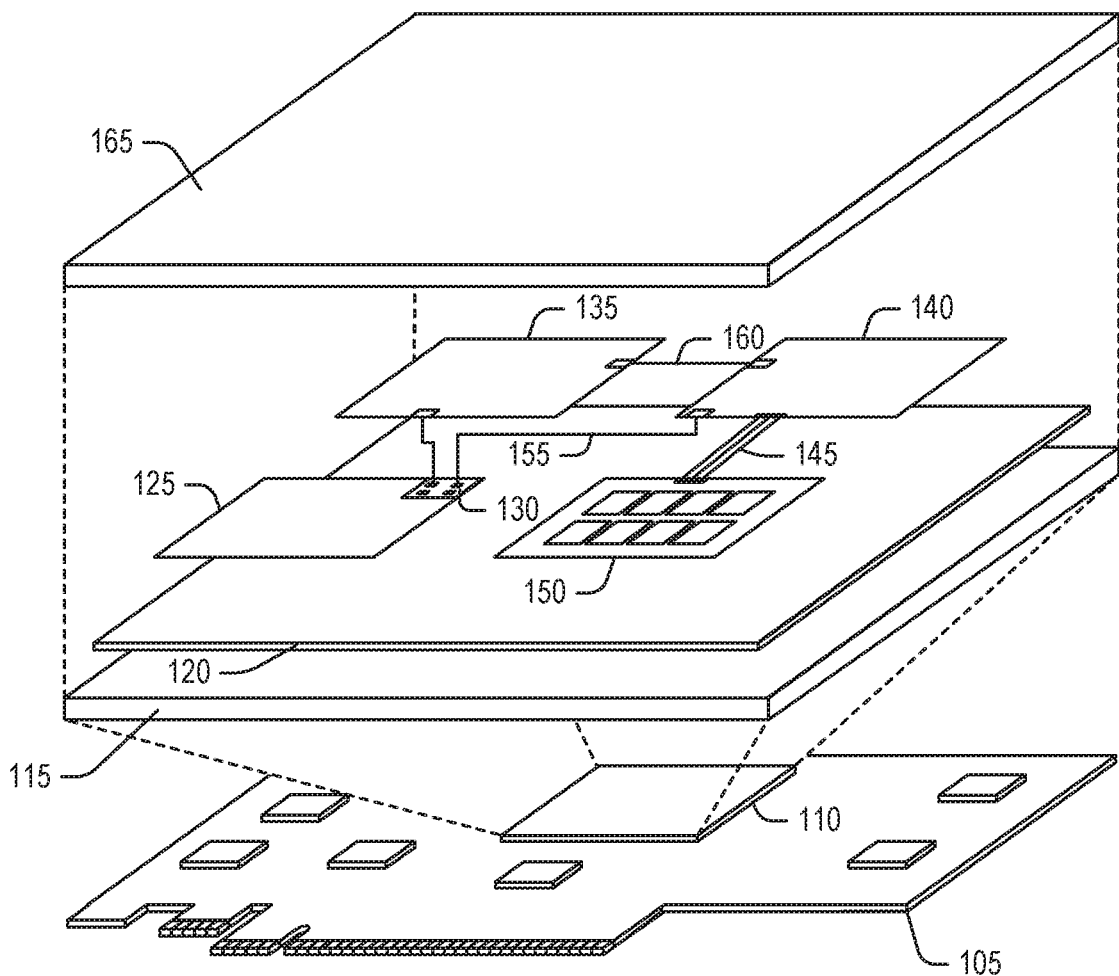
FIGS. 1A and 1B illustrate an example of a chiplet system, according to some examples of the present disclosure.
Figure 1B:
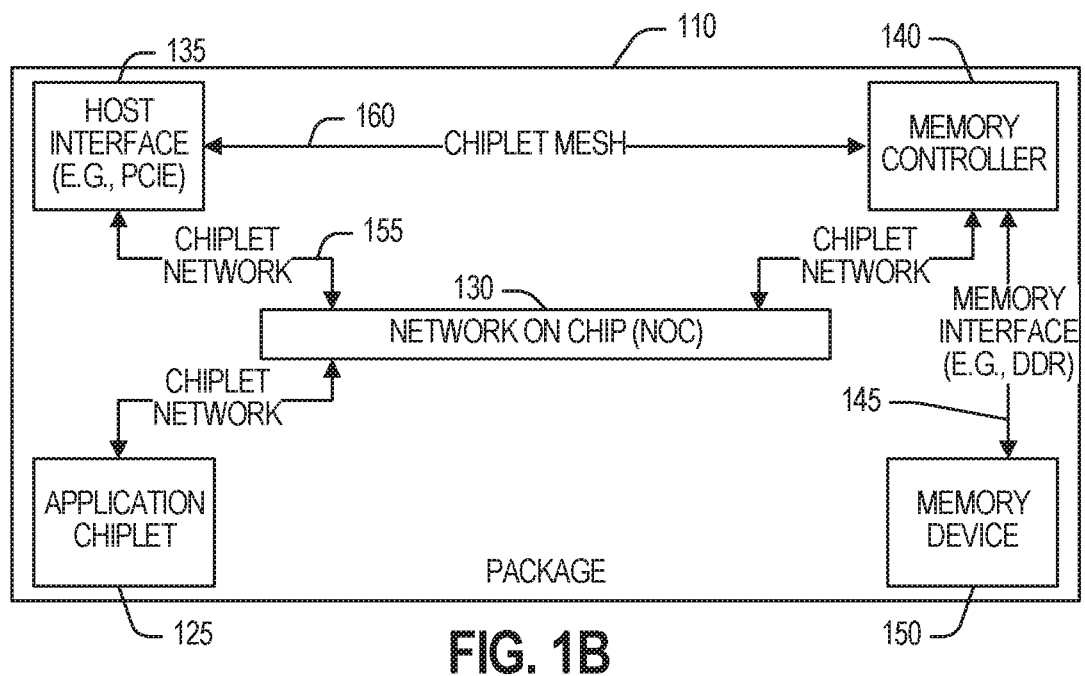

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB primary or secondary depending on which chiplet provides the primary clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic transactions are one or more data manipulation operations that, for example, may be performed by the memory controller chiplet 140. In other chiplet systems, the atomic transactions may be performed by other chiplets. For example, an atomic transaction of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic transactions avoid transmitting the data across the chiplet mesh network 160, resulting in lower latency execution of such commands.

Atomic transactions can be classified as built-in atomics or programmable (e.g., custom) atomic transactions. Built-in atomic transactions are a finite set of operations that are immutably implemented in hardware. Programmable atomic transactions are small programs with one or more instructions (e.g., an instruction set) that may execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
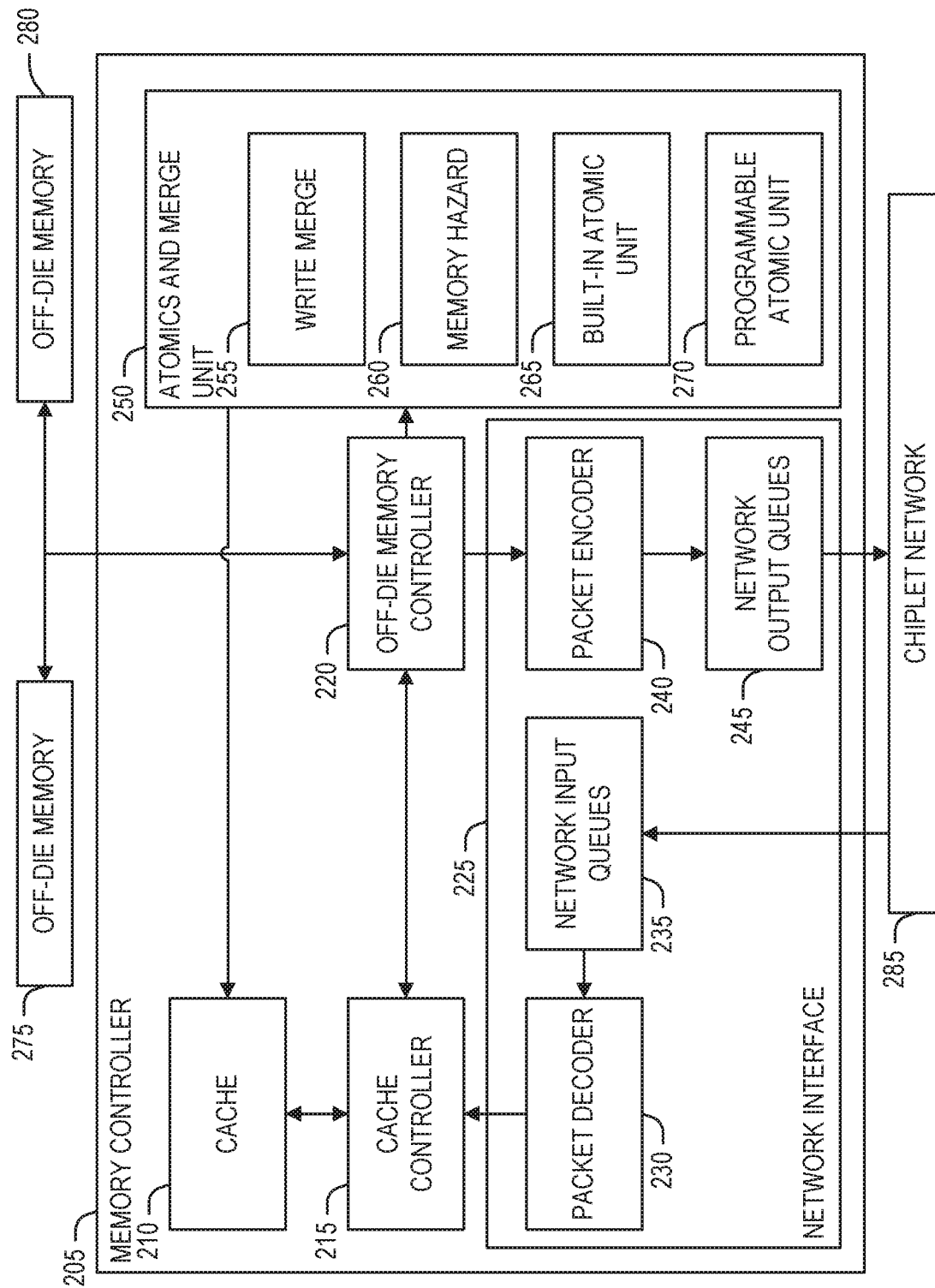
FIG. 2 illustrates components of an example of a memory controller chiplet, according to some examples of the present disclosure.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge unit 250. Members of this set can include, for example, a write merge unit 255, a memory hazard unit 260, built-in atomic unit 265 (for performing built in atomic transactions), or a programmable atomic unit (PAU) 270 (for performing programmable atomic transactions). The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic unit 265 receives the request and reads data, either from the write merge unit 255 or directly from the off-die memory controller 220. The atomic transaction is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic transactions such as fetch-and-increment or compare-and-swap. In an example, these transactions perform a simple read-modify-write operation to a single memory location of 32-bytes or less in size. Atomic memory transactions are initiated from a request packet transmitted over the chiplet network 285. The request packet has a physical address, atomic operator type, operand size, and optionally up to 32-bytes of data. The atomic transaction performs the read-modify-write to a cache memory line of the cache 210, filling the cache memory if necessary. The atomic transaction response can be a simple completion response, or a response with up to 32-bytes of data. Example atomic memory transactions include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic transactions can also involve requests for a "standard" atomic standard on the requested data, such as comparatively simple, single cycle, integer atomics-such as fetch-and-increment or compare-and-swap-which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic transaction. Following the atomic transaction, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic transactions (also referred to as "custom atomic transactions" or "custom atomic operations"), comparable to the performance of built-in atomic transactions. Rather than executing multiple memory accesses, in response to an atomic transaction request designating a programmable atomic transaction and a memory address, circuitry in the memory controller chiplet 205 transfers the atomic transaction request to PAU 270 and sets a hazard bit stored in a memory hazard register corresponding to the memory address of the memory line used in the atomic operation, to ensure that no other operation (read, write, or atomic transaction) is performed on that memory line, which hazard bit is then cleared upon completion of the atomic transaction. Additional, direct data paths provided for the PAU 270 executing the programmable atomic transactions allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic transactions. When provided with the extended instruction set for executing programmable atomic transactions, the processor of PAU 270 can be embodied as one or more hybrid threading processors. In some example embodiments, the processor of PAU 270 provides barrel-style, round-robin instantaneous thread switching to maintain a high instruction-per-clock rate.

PAU 270 may include a local memory, such as Static Random-Access Memory (SRAM), NAND, phase change memory, or the like. The local memory may include registers, instruction memory, and cache. The local memory may be accessible to the processor through a memory controller.

Programmable atomic transactions can be performed by the PAU 270 involving requests for programmable atomic transactions on the requested data. A user can prepare programming code in the form of one or more instructions to provide such programmable atomic transactions. For example, the programmable atomic transactions can be comparatively simple, multi-cycle operations such as floating-point addition, or comparatively complex, multi-instruction operations such as a Bloom filter insert. The programmable atomic transactions can be the same as or different than the predetermined atomic transactions, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic transaction. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic transactions is to provide multiple, generic, programmable atomic transaction request types that can be sent through the chiplet network 285 to the memory controller chiplet 205 from an originating source such as a processor or other system component. The cache controllers 215 or off-die memory controller 220 identify the request as a programmable atomic transaction and forward the request to the PAU 270. In a representative embodiment, the PAU 270: (1) is a programmable processing element capable of efficiently performing a user defined atomic transaction; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined transaction. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard unit 260. Accordingly, when the request and read data is received by the write merge unit 255, a reset or clear signal can be transmitted by the memory hazard unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

As previously described, repeated accesses of a same memory location may cause memory system performance degradation from either physical effects (such as temperature rises) caused by repeatedly accessing a same memory location, performance degradation from waiting for collisions to clear before accessing the memory location, or both. In some examples, degradation may include performance impacts to programs where memory accesses are waiting for collisions to clear before being serviced. In other examples, degradation may include temporary or permanent degradation caused by physical effects of repeatedly accessing a same memory location. Those effects may vary based upon the underlying storage technology. For example, excessive heat in a DRAM device may reduce data retention time in the memory cells. Hotspots in a flash memory device may require adjustments of voltages during read and/or write operations in order to accurately store and/or retrieve data. Ideally, a program that uses the memory would be written so that memory accesses are distributed evenly to avoid stressing particular locations of the memory. This is not always possible as a programmer does not always know which memory locations are stressed.

Disclosed in some examples, are methods, systems, machine readable mediums, memory devices, and memory controllers that detect memory hotspots. As used herein, memory hotspots are areas of memory that have frequent access collisions, rather than areas of memory that have temperature rises (although as previously explained there may be temperature rises associated with these areas as a result of the frequent use of those locations). As previously described, when a memory access request is received by the memory controller, the address in the request is hashed. The hash indexes to a position in a data structure that stores hazard indicators (e.g., a hazard bit(s) or a list of access requests). If the hazard indicators indicate that a memory access is currently in-progress for that memory address, the current request is stalled until the memory access that is currently in progress (and any memory accesses that may have already been waiting for that address) finishes.

To track hotspots, the memory controller may maintain a queue that stores addresses for memory accesses requests that stalled as a result of the hazard indicator. Each time a request is received, and the hazard indicator is set then the request address is pushed into the queue. Periodically the queue is serviced by a processor of the memory controller. For example, when the processor is idle, or every predetermined period of time. The processor services the queue by removing the contents (leaving the queue empty) and counting the number of times each memory address appears in the queue. The addresses with the highest counts are considered the more active memory locations. Any address with a count that is significantly higher than the others may be a memory hot spot. In some examples, the counts are absolute (e.g., continually incremented as the device operates). In other examples, the counts may be reported periodically and cleared, that is, every time the queue is serviced the counts for each memory location are reset. In still other examples the counts may be cleared periodically with a same or different period than the queue is serviced. By identifying where in a program memory hot spots are occurring, the memory accesses may be modified to reduce the memory hot spots.

In some examples, the queue entry includes a timestamp of when the request was received or when the request was placed into the queue. In other examples, if the queue is serviced in predetermined intervals, a timestamp may not be necessary as the system may know that the request was received sometime between service intervals. This may be a granular enough timestamp to calculate memory hotspots.

To simplify operation of the queue and to minimize latency, in some examples, if the queue is full, rather than servicing the queue at a time that may increase latency for memory accesses, a new request address that is waiting on the hazard is not pushed onto the queue when the queue is full. The queue is full when a specified number of addresses are stored in the queue or when a specified amount of memory is used for the queue. The queue may be stored in a working memory of the memory controller. In other examples, if the queue is full, the processor may service the queue at that point.

Figure 3:
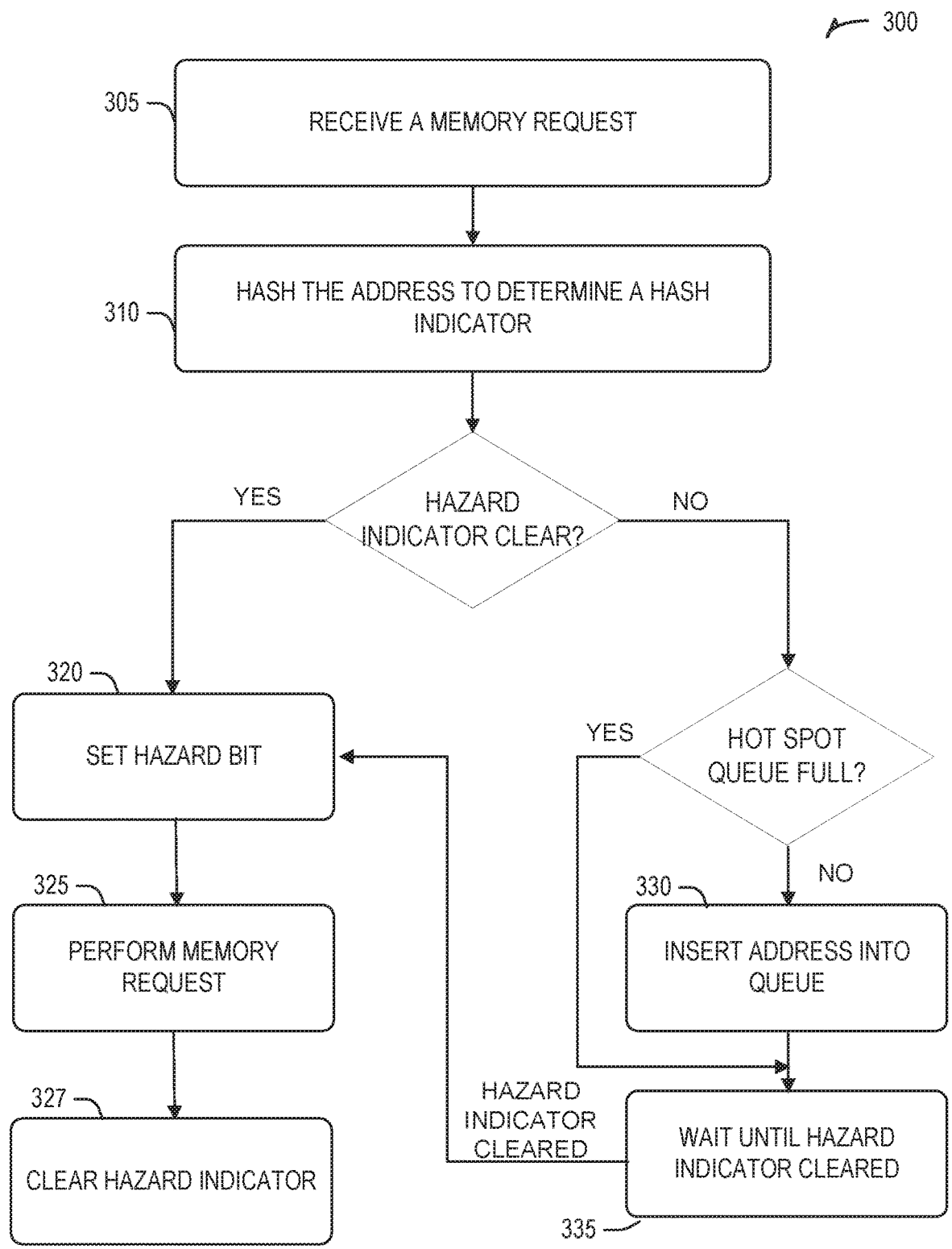
FIG. 3 illustrates a flowchart of a method 300 of identifying memory hot spots according to some examples of the present disclosure.

FIG. 3 illustrates a flowchart of a method 300 of identifying memory hot spots according to some examples of the present disclosure. At operation 305, the memory controller may receive a memory request. The request may be a read request, a write request, a modify request, an erase request, or the like that requests that the memory device read, write, modify, erase, or perform another operation on a particular value stored at an address included in the request.

At operation 310, the address included in the request may be hashed using a hashing function to determine an index into a hazard data structure that stores an indicator whether the memory location is being accessed by another operation. The hazard indicator may be a bit where a first value indicates that the hazard is clear, and a second value that indicates that the hazard is not clear. In other examples, other structures may be utilized. For example, the hash value may index into an array of more advanced structures such as a linked list, a queue, or the like. In these examples, the queue and/or linked list may describe any requests currently being serviced and requests waiting that may be serviced prior to the present request. In these examples, memory requests that are waiting in a queue may be serviced on a first-come-first-serve basis. Thus, if there are multiple requests waiting to access the address, the request that was received first is serviced first, the request that is received second is serviced second, and so on. The data structures may store the order in which to service the requests (e.g., the order in which requests are placed in the data structure may indicate the order in which they are to be serviced). The memory requests that are waiting for servicing related to the address may be described by the data structures. In some examples, with these more advanced data structures, determining whether the hazard indicator is clear comprises determining if any records exist of previous requests that are either pending or waiting on a pending request.

If the hazard indicator is clear, then at operation 320 the indicator may be set to prevent another memory access to this address until the memory operation is complete. In examples in which the hazard is a bit, the bit may be set or cleared to indicate that an operation is currently pending on the address. In other examples, with more advanced hazard structures, an entry may be created (e.g., a linked list entry) that indicates that a request is being processed. At operation 325 the memory request is performed. At operation 327, once the memory request is completed, the hazard bit is cleared so another operation on that memory address may be performed. For example, the bit is changed from a value indicating that the memory is being accessed and a current request is being processed to a value indicating that the memory is not being accessed currently. In other examples, one or more data structures may be cleared, or removed from queues, lists, or the like to clear the hazard indicator.

If the hazard bit is not clear and a request for that address is received, then a check to see if the hot spot queue is full. If not, then at operation 330, the address received with the request at operation 305 may be added to the queue. If the queue is full or once the address is inserted into the queue, then at operation 335 the system queues the request until the hazard indicator is cleared when the already pending memory operation completes. Once the hazard indicator clears, operation proceeds to operations 320, 325, and 327 to satisfy the memory request.

Figure 4:
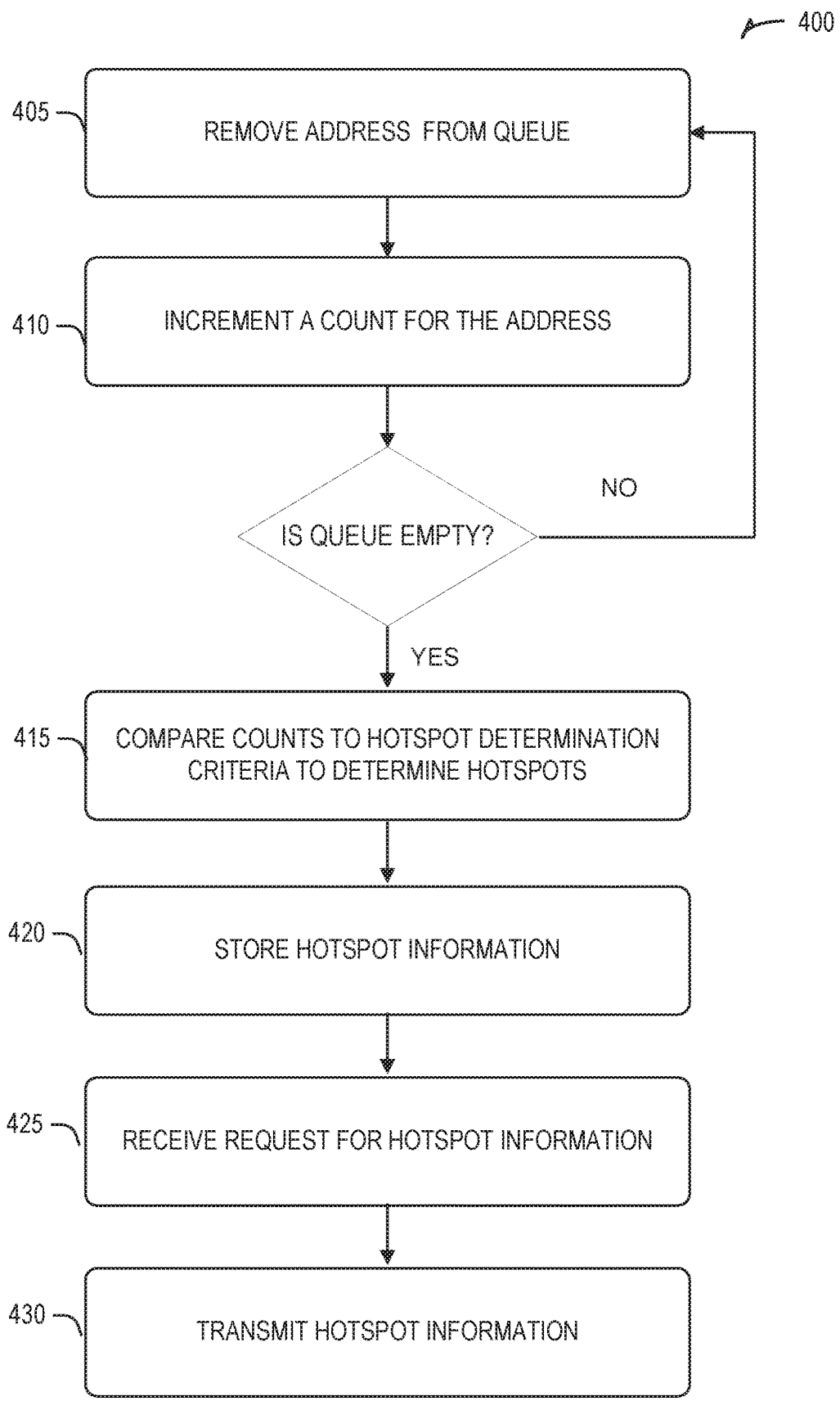
FIG. 4 illustrates a flowchart of a method of servicing the hotspot queue according to some examples of the present disclosure.

FIG. 4 illustrates a flowchart of a method of servicing the hotspot queue according to some examples of the present disclosure. The queue may be serviced periodically with a prespecified frequency. In other examples, the queue may be serviced when it is full—either immediately, or after a period of inactivity after the queue is full (to ensure servicing the queue does not interfere with requests made to the memory controller). At operation 405, a first address in the queue may be read, for example, the value may be dequeued and stored in operating memory of the memory controller. At operation 410, for the first memory address read from the queue, a counter may be incremented indicating that a request for an access of the address was delayed due to an already in-progress request.

If the queue is not empty, operations 405 and 410 are repeated for each subsequent address in the queue. Once the queue is empty, at operation 415, the counts may be compared to a hotspot determination criteria to determine memory hot spots. For example, a memory address with a count that is over a specified threshold number of accesses may be considered a hotspot. In other examples, an average count of all the memory addresses from the queue may be determined and memory addresses with counts over a threshold number of the average may be considered to be a hotspot. In still other examples the criteria may be a top n memory addresses; a top n % of memory addresses; or the like.

In some examples (e.g., where the queue is serviced at a prespecified frequency that matches a time frame over which the hotspots are measured), the hotspot counters for each address may be zeroed at the beginning of method 400. In other examples, the queue may be serviced at a rate greater than the rate over which hotspots are measured—in these examples, the counters are reset after expiry of a time period over which the hotspots are measured. In still other examples, the counters are not reset until the memory controller is reset or powered down.

At operation 420, information about the hotspots may be stored. For example, the memory addresses that are considered hotspots at operation 415 and data regarding the memory address (e.g., a count of the number of accesses), and other statistics (such as the number of accesses over other time periods) may be stored—such as in the memory device. In other examples, operation 415 may not be performed and the counts determined at operation 410 may be stored for each address.

At operation 425 a request may be received for the hotspot information. For example, by a processor that is internal or external to the memory controller chiplet through an external or internal communications interface. At operation 430, the memory controller may transmit a response including the stored hotspot information.

Figure 5:
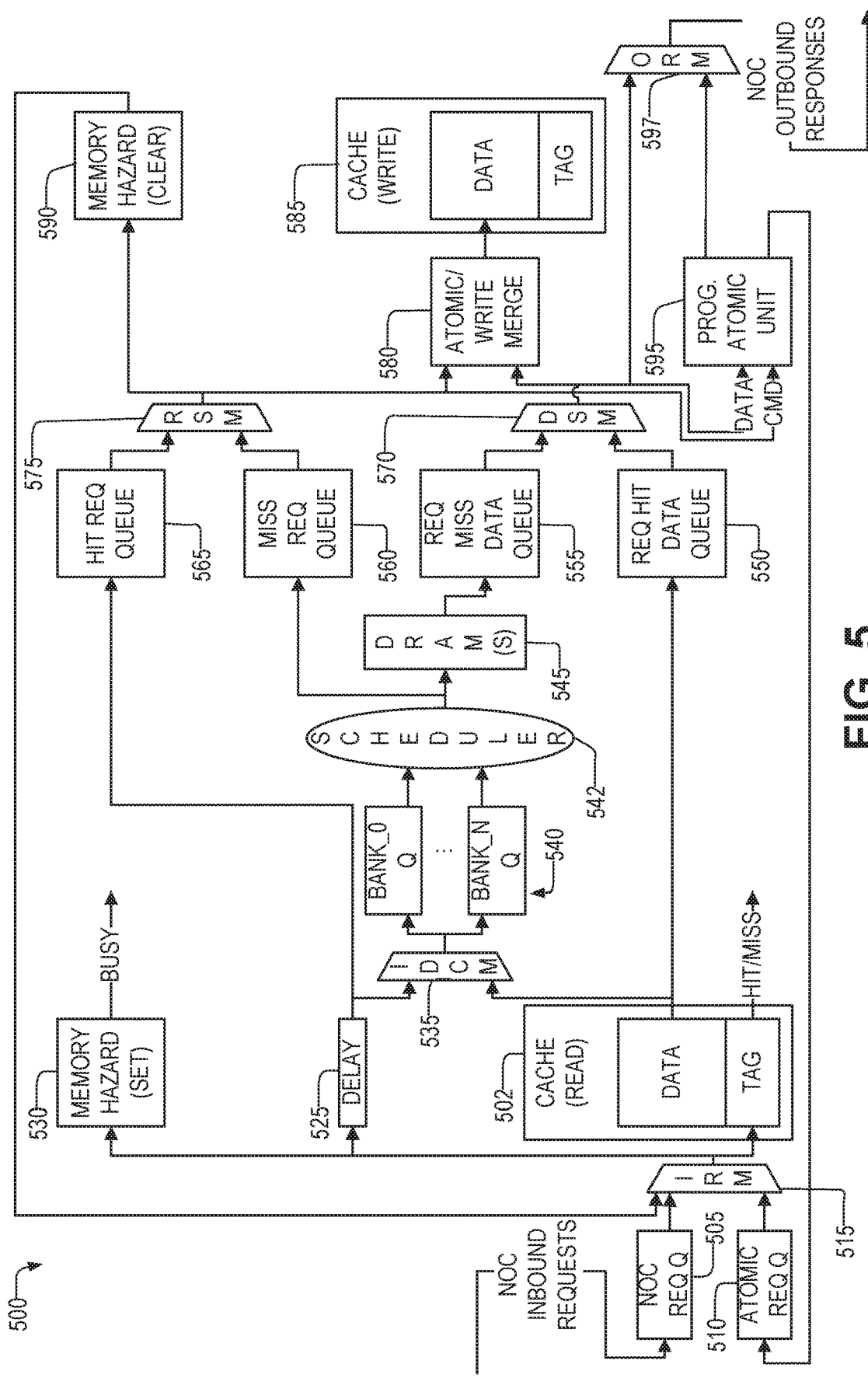
FIG. 5 illustrates a block diagram of a memory controller 500 according to some examples of the present disclosure.

FIG. 5 illustrates a schematic of a memory controller 500 according to some examples of the present disclosure. FIG. 5 is another example of a memory controller chiplet 205 and shows many of the same components as shown in FIG. 2. For example, the cache 520 and 585 are examples of cache 210; DRAM(s) 545 are examples of off-die memory 275-280; atomic/write merge 580 and the programmable atomic unit 595 may be an example of atomics and merge unit 250; other components of FIG. 5 may be examples of other components of FIG. 2 such as off-die memory controller 220 and cache controller 215. NOC Request Queue 505 receives requests from the network-on-chip and provides a small amount of queuing. Atomic Request Queue 510 receives requests from the programmable atomic unit and provides a small amount of queuing. Inbound Request Multiplexer (IRM) 515 selects between inbound memory request sources. The three sources, in order of priority are: Memory Hazard Requests, Atomic Requests, and Inbound NOC Requests. Cache (Read) 502 and Cache (Write) 585 is an SRAM data cache. The diagram shows the cache as two separate blocks (502 and 585), one providing read access, the other providing write access. Delay Block 525 provides one or more pipeline stages to mimic the delay for an SRAM cache read operation. A cache miss requires access to memory to bring the desired data into the cache. During this DRAM access time, the memory line is not available for other requests. The Memory Hazard block (Set block 530 and Clear block 590) maintains a table of hazard bits indicating which memory lines are unavailable for access. An inbound request that tries to access a line with a hazard is held by the Memory Hazard block until the hazard is cleared. Once the hazard is cleared then the request is resent through the Inbound Request Multiplexer. The memory line tag address is hashed to a hazard bit index. The number of hazard bits may be chosen to set the hazard collision probability to a sufficiently low level. Inbound DRAM Control Multiplexer (IDCM) 535 selects from an inbound NOC request and a cache eviction request. Bank Request Queues 540—each separately managed DRAM bank has a dedicated bank request queue to hold requests until they can be scheduled on the associated DRAM bank.

Scheduler 542 selects across the bank queues 540 to choose a request for an available DRAM bank. The DRAM (s) 545 represents the external DRAM device or devices. Request Hit Data Queue 550 holds request data from cache hits until selected. Request Miss Data Queue 555 holds data read from the DRAM(s) until selected. Miss Request Queue 560 is used to hold request packet information for cache misses until the request is selected. Hit Request Queue 565 holds request packet information for cache hits until selected. Data Selection Multiplexer (DSM) 570 selects between DRAM read data and cache hit read data. The selected data is written to the SRAM cache. Request Selection Multiplexer (RSM) 575 selects between hit and miss request queues 560 and 565.

Atomic/Write Merge 580 either merges the request data and DRAM read data, or, if the request is a built-in atomic, the memory data and request data are used as inputs for an atomic operation. Cache (Write) block 585 represents the write port for the SRAM cache. Data from a NOC write request and data from DRAM read operations are written to the SRAM cache. Memory Hazard (Clear) block 590 represents the hazard clear operation for the memory hazard structure. Clearing a hazard may release a pending NOC request and send it to the Inbound Request Multiplexer. Programmable Atomic Unit 595 processes programmable atomic transactions. NOC Outbound Response Multiplexer (ORM) 597 selects between memory controller responses and custom atomic unit responses and sends the selection to the NOC.

Figure 6:
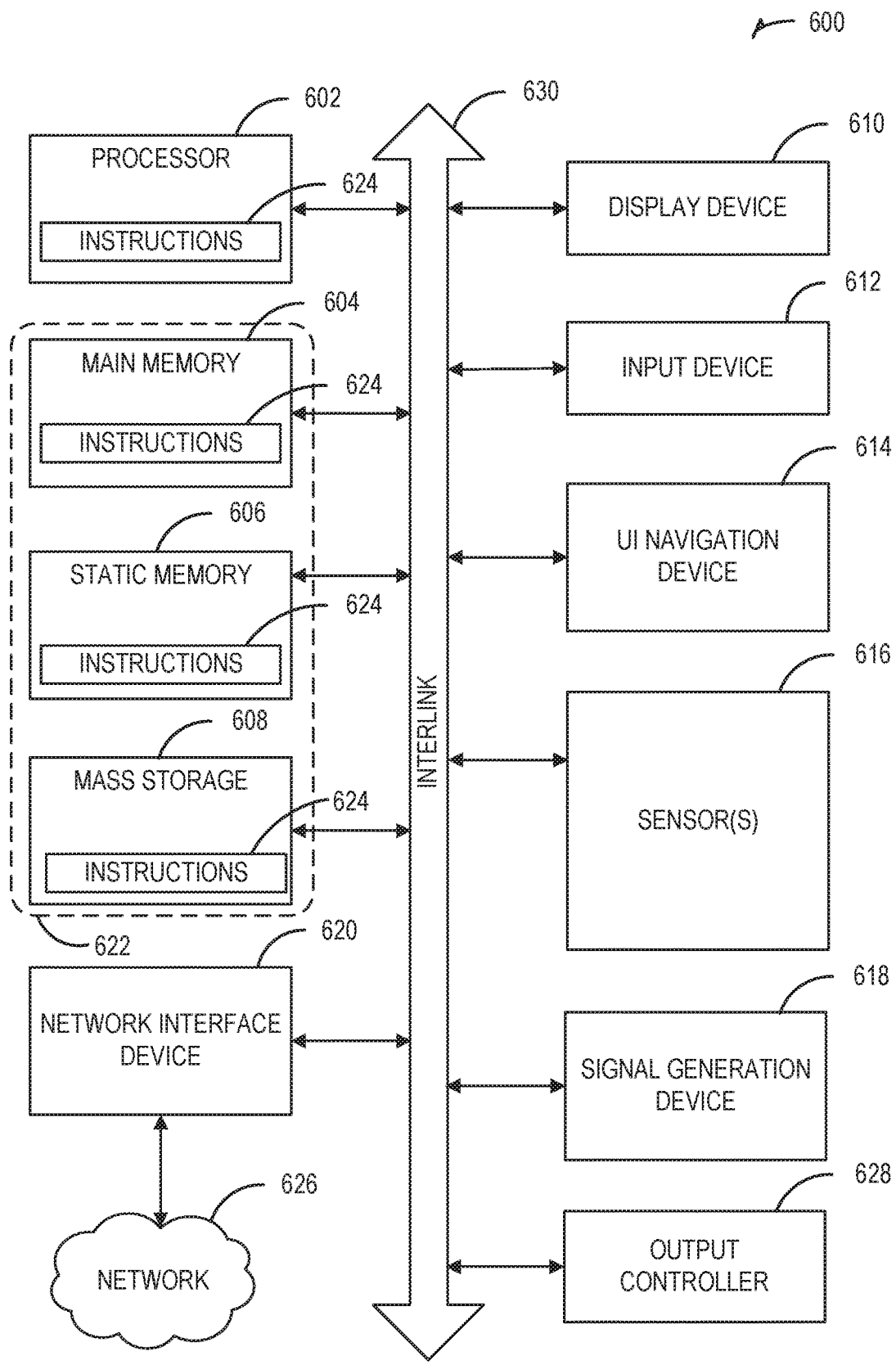
FIG. 6 is a block diagram of an example of a machine with which, in which, or by which embodiments of the present disclosure can operate according to some examples of the present disclosure.

FIG. 6 illustrates a block diagram of an example machine 600 with which, in which, or by which any one or more of the techniques (e.g., methodologies) discussed herein can be implemented. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible overtime. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which can communicate with each other via an interlink (e.g., bus) 630. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a mass storage (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 can be representative of the instructions 624, such as instructions 624 themselves or a format from which the instructions 624 can be derived. This format from which the instructions 624 can be derived can include source code, encoded instructions (e.g., in compressed or encrypted form), packaged instructions (e.g., split into multiple packages), or the like. The information representative of the instructions 624 in the machine readable medium 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 can include assembly, compilation, or interpretation of the information (e.g., by the processing circuitry) to create the instructions 624 from some intermediate or preprocessed format provided by the machine readable medium 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

OTHER NOTES AND EXAMPLES

Example 1 is an apparatus comprising: a memory array; a hazard indicator memory; a hazard queue; a processor coupled to the memory array, hazard indicator, and hazard queue and configured to: receive a memory access request for a memory address of the memory array; determine that a hazard indicator in the hazard indicator memory is set for the memory address; responsive to determining that the hazard indicator is set for the memory address, add the memory address to the hazard queue; increment a memory access count for each address in the hazard queue; create hotspot information based upon the memory access count for each address in the hazard queue; receive a request for the hotspot information, the request from an off-die processor; and transmit the hotspot information to the off-die processor.

In Example 2, the subject matter of Example 1 includes, wherein the hotspot information comprises an identification of one or more hotspot addresses and wherein the processor is configured to create hotspot information by being configured to identify the one or more hotspot addresses based upon the memory access counts for the one or more hotspot addresses being above a threshold.

In Example 3, the subject matter of Examples 1-2 includes, wherein the hotspot information comprises an identification of one or more hotspot addresses and wherein the processor is configured to create hotspot information by being configured to identify the one or more hotspot addresses based upon the memory access counts for the one or more hotspot addresses being a threshold number above an average access amount.

In Example 4, the subject matter of Examples 1-3 includes, wherein the processor is further configured to: delay execution of the memory access request until the hazard indicator is cleared responsive to determining that the hazard indicator is set for the address.

In Example 5, the subject matter of Examples 1-4 includes, wherein the processor is further configured to: receive a second memory access request for a second memory address; determine that a hazard indicator is set for the second memory address; responsive to a determination that the hazard indicator is set for the second memory address, determine that the hazard queue is full; and responsive to a determination that the hazard queue is full, refrain from adding the second memory address to the hazard queue.

In Example 6, the subject matter of Examples 1-5 includes, wherein the hazard indicator is a hazard bit.

In Example 7, the subject matter of Examples 1-6 includes, wherein the hotspot information comprises an identification of one or more hotspot addresses and wherein the processor is configured to create hotspot information by being configured to identify the one or more hotspot addresses based upon the access counts.

Example 8 is a method comprising: receiving a memory access request for a memory address of a memory array; determining that a hazard indicator is set for the memory address; responsive to determining that the hazard indicator is set for the memory address, adding the memory address to a hazard queue; incrementing a memory access count for each address in the hazard queue; creating hotspot information based upon the memory access count for each address in the hazard queue; receiving a request for the hotspot information, the request from an off-die processor; and transmitting the hotspot information to the off-die processor.

In Example 9, the subject matter of Example 8 includes, wherein the hotspot information comprises an identification of one or more hotspot addresses and wherein creating hotspot information comprises identifying the one or more hotspot addresses based upon the memory access counts for the one or more hotspot addresses being above a threshold.

In Example 10, the subject matter of Examples 8-9 includes, wherein the hotspot information comprises an identification of one or more hotspot addresses and wherein creating hotspot information comprises identifying the one or more hotspot addresses based upon the memory access counts for the one or more hotspot addresses being a threshold number above an average access amount.

In Example 11, the subject matter of Examples 8-10 includes, wherein responsive to determining that the hazard indicator is set for the address, delaying execution of the memory access request until the hazard indicator is cleared.

In Example 12, the subject matter of Examples 8-11 includes, receiving a second memory access request for a second memory address; determining that a hazard indicator is set for the second memory address; responsive to determining that the hazard indicator is set for the second memory address, determining that the hazard queue is full; and responsive to determining that the hazard queue is full, not adding the second memory address to the hazard queue.

In Example 13, the subject matter of Examples 8-12 includes, wherein the hazard indicator is a hazard bit.

In Example 14, the subject matter of Examples 8-13 includes, wherein the hotspot information comprises an identification of one or more hotspot addresses and wherein creating hotspot information comprises identifying the one or more hotspot addresses based upon the access counts.

Example 15 is a non-transitory machine-readable medium, storing instructions, which when executed by a machine, cause the machine to perform operations comprising: receiving a memory access request for a memory address of a memory array; determining that a hazard indicator is set for the memory address; responsive to determining that the hazard indicator is set for the memory address, adding the memory address to a hazard queue; incrementing a memory access count for each address in the hazard queue; creating hotspot information based upon the memory access count for each address in the hazard queue;

receiving a request for the hotspot information, the request from an off-die processor; and transmitting the hotspot information to the off-die processor.

In Example 16, the subject matter of Example 15 includes, wherein the hotspot information comprises an identification of one or more hotspot addresses and wherein the operations of creating hotspot information comprises identifying the one or more hotspot addresses based upon the memory access counts for the one or more hotspot addresses being above a threshold.

In Example 17, the subject matter of Examples 15-16 includes, wherein the hotspot information comprises an identification of one or more hotspot addresses and wherein the operations of creating hotspot information comprises identifying the one or more hotspot addresses based upon the memory access counts for the one or more hotspot addresses being a threshold number above an average access amount.

In Example 18, the subject matter of Examples 15-17 includes, wherein responsive to determining that the hazard indicator is set for the address, delaying execution of the memory access request until the hazard indicator is cleared.

In Example 19, the subject matter of Examples 15-18 includes, wherein the operations further comprise: receiving a second memory access request for a second memory address; determining that a hazard indicator is set for the second memory address; responsive to determining that the hazard indicator is set for the second memory address, determining that the hazard queue is full; and responsive to determining that the hazard queue is full, not adding the second memory address to the hazard queue.

In Example 20, the subject matter of Examples 15-19 includes, wherein the hazard indicator is a hazard bit.

In Example 21, the subject matter of Examples 15-20 includes, wherein the hotspot information comprises an identification of one or more hotspot addresses and wherein the operations of creating hotspot information comprises identifying the one or more hotspot addresses based upon the access counts.

Example 22 is a device comprising: means for receiving a memory access request for a memory address of a memory array; means for determining that a hazard indicator is set for the memory address; means for, responsive to determining that the hazard indicator is set for the memory address, adding the memory address to a hazard queue; means for incrementing a memory access count for each address in the hazard queue; means for creating hotspot information based upon the memory access count for each address in the hazard queue; means for receiving a request for the hotspot information, the request from an off-die processor; and means for transmitting the hotspot information to the off-die processor.

In Example 23, the subject matter of Example 22 includes, wherein the hotspot information comprises an identification of one or more hotspot addresses and wherein the means for creating hotspot information comprises means for identifying the one or more hotspot addresses based upon the memory access counts for the one or more hotspot addresses being above a threshold.

In Example 24, the subject matter of Examples 22-23 includes, wherein the hotspot information comprises an identification of one or more hotspot addresses and wherein the means for creating hotspot information comprises means for identifying the one or more hotspot addresses based upon the memory access counts for the one or more hotspot addresses being a threshold number above an average access amount.

In Example 25, the subject matter of Examples 22-24 includes, wherein the device further comprises means for, responsive to determining that the hazard indicator is set for the address, delaying execution of the memory access request until the hazard indicator is cleared.

In Example 26, the subject matter of Examples 22-25 includes, means for receiving a second memory access request for a second memory address; means for determining that a hazard indicator is set for the second memory address; means for, responsive to determining that the hazard indicator is set for the second memory address, determining that the hazard queue is full; and means for, responsive to determining that the hazard queue is full, not adding the second memory address to the hazard queue.

In Example 27, the subject matter of Examples 22-26 includes, wherein the hazard indicator is a hazard bit.

In Example 28, the subject matter of Examples 22-27 includes, wherein the hotspot information comprises an identification of one or more hotspot addresses and wherein the means for creating hotspot information comprises identifying the one or more hotspot addresses based upon the access counts.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
a memory array;
a hazard indicator memory;
a hotspot queue;
a memory access request queue;
a processor chiplet coupled to the memory array, hazard indicator, and hotspot queue and configured to:
receive a memory access request for a memory address of the memory array from a second processor chiplet over a packet-based network;
determine that a hazard indicator in the hazard indicator memory indicates that a memory access is currently in-progress for the memory address;
responsive to determining that the hazard indicator indicates that a memory access is currently in-progress for the memory address, add the memory address to the hotspot queue;
periodically calculate a memory access count for each address in the hotspot queue, the memory access counts recording counts of the number of times that memory access requests to particular addresses were stalled waiting for another command directed to a same address to finish;
create hotspot information based upon the memory access count for each address in the hotspot queue;
receive a request over the packet-based network for the hotspot information, the request from the second processor chiplet; and
transmit the hotspot information to the second processor chiplet, wherein the processor chiplet and the second processor chiplet are mounted on a same package substrate.

2. The apparatus of claim 1, wherein the hotspot information comprises an identification of one or more hotspot addresses and wherein the processor chiplet is configured to create hotspot information by being configured to identify the one or more hotspot addresses based upon the memory access counts for the one or more hotspot addresses being above a threshold.

3. The apparatus of claim 1, wherein the hotspot information comprises an identification of one or more hotspot addresses and wherein the processor chiplet is configured to create hotspot information by being configured to identify the one or more hotspot addresses based upon the memory access counts for the one or more hotspot addresses being a threshold number above an average access amount.

4. The apparatus of claim 1, wherein the processor chiplet is further configured to:
delay execution of the memory access request until the hazard indicator is cleared responsive to determining that the hazard indicator is set for the address.

5. The apparatus of claim 1, wherein the processor chiplet is further configured to:
receive a second memory access request for a second memory address;
determine that a hazard indicator is set for the second memory address;
responsive to a determination that the hazard indicator is set for the second memory address, determine that the hotspot queue is full; and
responsive to a determination that the hotspot queue is full, refrain from adding the second memory address to the hotspot queue.

6. The apparatus of claim 1, wherein the hazard indicator is a hazard bit.

7. The apparatus of claim 1, wherein the hotspot information comprises an identification of one or more hotspot addresses and wherein the processor chiplet is configured to create hotspot information by being configured to identify the one or more hotspot addresses based upon the access counts.

8. A method comprising:
at a processor chiplet:
receiving, from a second processor chiplet over a packet-based network, a memory access request for a memory address of a memory array;
determining that a hazard indicator indicates that a memory access is currently in-progress for the memory address;
responsive to determining that the hazard indicator indicates that a memory access is currently in-progress for the memory address, adding the memory address to a hotspot queue;
periodically calculating a memory access count for each address in the hotspot queue, the memory access counts recording counts of the number of times that memory access requests to particular addresses were stalled waiting for another command directed to a same address to finish;
creating hotspot information based upon the memory access count for each address in the hotspot queue;
receiving a request over the packet-based network for the hotspot information, the request from a second processor chiplet; and
transmitting the hotspot information to the second processor, wherein the processor chiplet and the second processor chiplet are mounted on a same package substrate.

9. The method of claim 8, wherein the hotspot information comprises an identification of one or more hotspot addresses and wherein creating hotspot information comprises identifying the one or more hotspot addresses based upon the memory access counts for the one or more hotspot addresses being above a threshold.

10. The method of claim 8, wherein the hotspot information comprises an identification of one or more hotspot addresses and wherein creating hotspot information comprises identifying the one or more hotspot addresses based upon the memory access counts for the one or more hotspot addresses being a threshold number above an average access amount.

11. The method of claim 8, wherein responsive to determining that the hazard indicator is set for the address, delaying execution of the memory access request until the hazard indicator is cleared.

12. The method of claim 8, further comprising:
receiving a second memory access request for a second memory address;
determining that a hazard indicator is set for the second memory address;
responsive to determining that the hazard indicator is set for the second memory address, determining that the hotspot queue is full; and
responsive to determining that the hotspot queue is full, not adding the second memory address to the hotspot queue.

13. The method of claim 8, wherein the hazard indicator is a hazard bit.

14. The method of claim 8, wherein the hotspot information comprises an identification of one or more hotspot addresses and wherein creating hotspot information comprises identifying the one or more hotspot addresses based upon the access counts.

15. A non-transitory machine-readable medium, storing instructions, which when executed by a processor chiplet, cause the processor chiplet to perform operations comprising:
receiving a memory access request for a memory address of a memory array from a second processor chiplet over a packet-based network;
determining that a hazard indicator in a hazard indicator memory indicates that a memory access is currently in-progress for the memory address;
responsive to determining that the hazard indicator indicates that a memory access is currently in-progress for the memory address, add the memory address to a hotspot queue;
periodically calculating a memory access count for each address in the hotspot queue, the memory access counts recording counts of the number of times that memory access requests to particular addresses were stalled waiting for another command directed to a same address to finish;
creating hotspot information based upon the memory access count for each address in the hotspot queue;
receiving a request over the packet-based network for the hotspot information, the request from the second processor chiplet; and
transmitting the hotspot information to the second processor chiplet, wherein the processor chiplet and the second processor chiplet are mounted on a same package substrate.

16. The non-transitory machine-readable medium of claim 15, wherein the hotspot information comprises an identification of one or more hotspot addresses and wherein the operations of creating hotspot information comprises identifying the one or more hotspot addresses based upon the memory access counts for the one or more hotspot addresses being above a threshold.

17. The non-transitory machine-readable medium of claim 15, wherein the hotspot information comprises an identification of one or more hotspot addresses and wherein the operations of creating hotspot information comprises identifying the one or more hotspot addresses based upon the memory access counts for the one or more hotspot addresses being a threshold number above an average access amount.

18. The non-transitory machine-readable medium of claim 15, wherein responsive to determining that the hazard indicator is set for the address, delaying execution of the memory access request until the hazard indicator is cleared.

19. The non-transitory machine-readable medium of claim 15, wherein the operations further comprise:
receiving a second memory access request for a second memory address;
determining that a hazard indicator is set for the second memory address;
responsive to determining that the hazard indicator is set for the second memory address, determining that the hotspot queue is full; and
responsive to determining that the hotspot queue is full, not adding the second memory address to the hotspot queue.

20. The non-transitory machine-readable medium of claim 15, wherein the hazard indicator is a hazard bit.

* * * * *